2 Sheets—Sheet 1.

W. B. LODGE.

Assignor by mesne assignments to the PATENT FULLING MILL CO.

FULLING-STOCKS.

No. 7,423. Reissued Dec. 12, 1876.

Witnesses:
P. C. Dieterich
Frank H. Daffy

Inventor:
Wm. B. Lodge
Per: C. H. Watson & Co. Attorneys.

THE GRAPHIC CO. N.Y.

2 Sheets—Sheet 2.

W. B. LODGE.

Assignor by mesne assignments to the PATENT FULLING MILL CO.

FULLING-STOCKS.

No. 7,423. Reissued Dec. 12, 1876.

Witnesses:

T. C. Dieterich

Frank H. Daffy

Inventor:

Chas. B. Lodge,

Per: C. H. Watson & Co. Attorneys.

THE GRAPHIC CO. N.Y.

UNITED STATES PATENT OFFICE.

WILLIAM B. LODGE, OF SLATE HILL, NEW YORK, ASSIGNOR, BY MESNE ASSIGNMENTS, TO THE PATENT FULLING MILL COMPANY.

IMPROVEMENT IN FULLING-STOCKS.

Specification forming part of Letters Patent No. 66,095, dated June 25, 1867; reissue No. 7,423, dated December 12, 1876; application filed November 20, 1876.

*To all whom it may concern:*

Be it known that I, WILLIAM B. LODGE, now of Slate Hill, Orange county, New York, formerly of Danbury, in the county of Fairfield and State of Connecticut, have invented certain new and useful Improvements in Fulling-Mills; and I do hereby declare that the following is a full, clear, and exact description thereof, that will enable others skilled in the art to which it appertains to make and use the same, reference being had to the accompanying drawings, and to the letters of reference marked thereon, which form a part of this specification.

Figure 1:
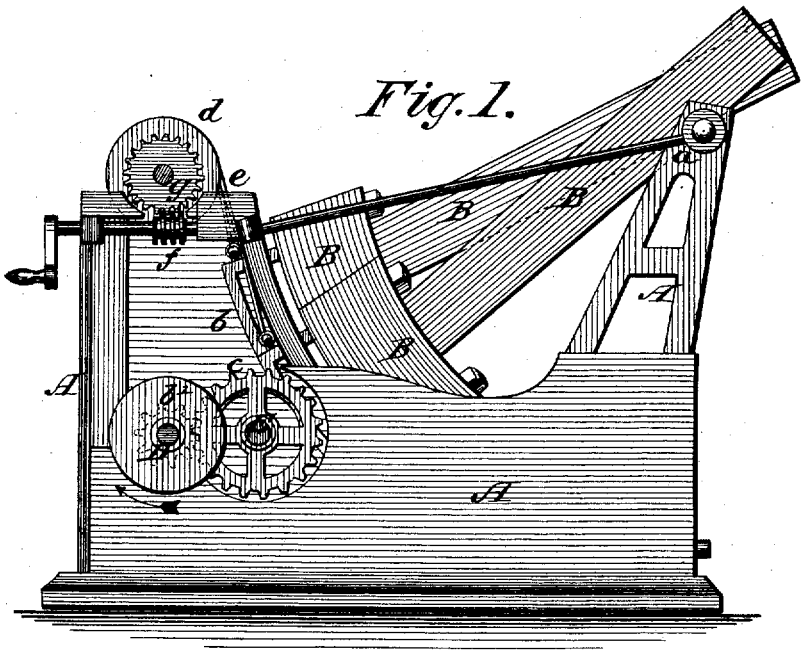
Figure 3:
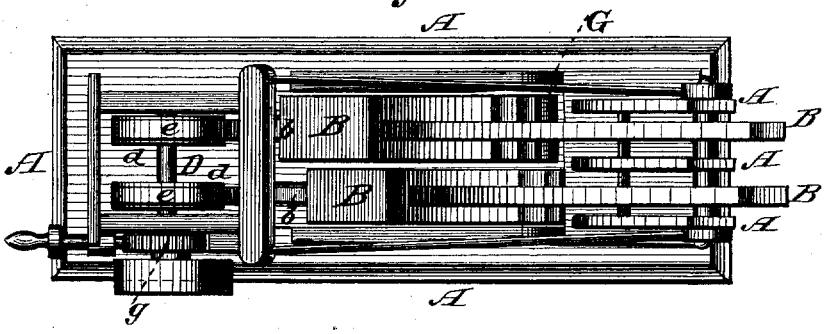
Figure 2:
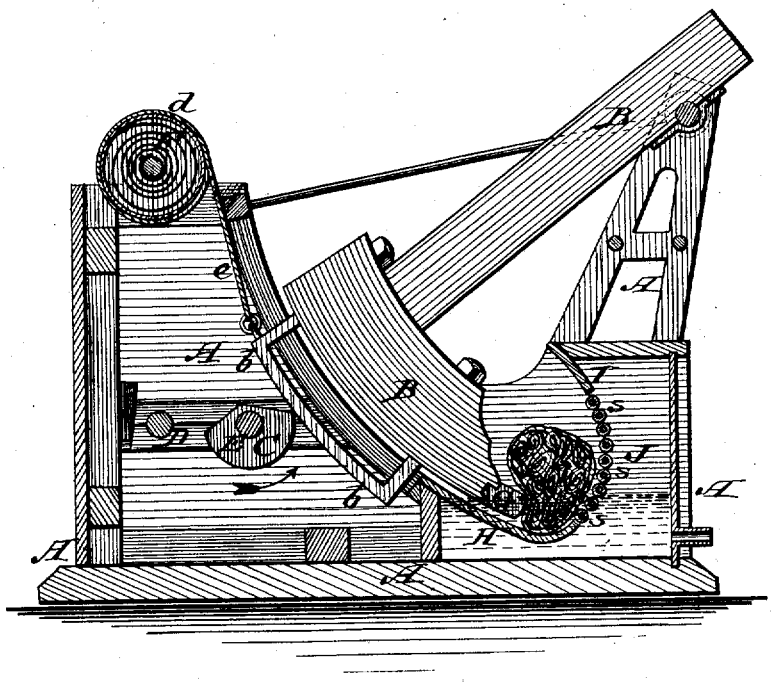

Figure 1 represents a side elevation of a fulling-mill constructed according to my improvement; Fig. 2, a longitudinal section thereof, and Fig. 3 is a plan view of the same.

Like letters indicate corresponding parts throughout the several figures.

The nature of my invention consists in a novel mode of raising the hammers or beaters by a friction mechanism, in the place of the ordinary toe-and-wiper action, and whereby friction is reduced; also, in regulating the fall of the beaters by means of a spring or springs, made adjustable as regards their tension, to control the force of the blow.

Likewise, said invention further consists in a hollow box-like formation on the outside or surrounding the bed and bosom of the mill, and supplied with water heated by steam or otherwise; also, in an open-work or perforated bosom, for the circulation of the heated water through the same, and in constructing the bosom of a series of rollers, that assist in turning the goods, and admit of a more rapid motion being given to the stocks, said invention also embracing india-rubber or other like soft and elastic toes to the beaters, to prevent injury to the goods being fulled or felted.

Referring to the accompanying drawings, A represents the standards and frame-work of the mill; B, the swinging beaters or hammers, hung or pivoted, as at *a*, for operation as in other fulling-stocks, but differing therefrom in the following respects: Instead of lifting the beaters by the ordinary toe-and-wiper action, which induces much wear and friction, I cause said beaters or hammers to be raised by means of revolving cams or friction-blocks C, cut away, substantially as represented in Fig. 2, so as to lift, during a portion of the revolution of the rollers or cams, and suddenly let drop the hammers after being raised, said cams thus operating in a smooth and easy manner on, say, the backs of shoes *b*, fast to the hammers, and being, it may be, rotated by gear *b c* on horizontal shafts D E, the latter of which carries the cams.

A further difference, also, is to be found in means for controlling the force of the blow, consisting of spring or springs F, arranged within and acting on drums *d*, that carry straps *e*, fast at their one end to said drum, and at their others to the hammers, the fall of which or force of the blow they serve to regulate to suit different kinds or qualities of work, according as more or less tension is given to the springs by, say, an endless screw, *f*, working into a worm-wheel, *g*, fast on the shaft that carries the drums. Such means, however, may be materially varied, to produce the same action or effect, in substantially like manner.

Likewise, instead of toes G of the hammer being made, as usual, of wood or other like hard material, I preferably construct them of india-rubber, gutta-percha, or other analogous pliable and elastic substance, which prevents cutting of or injury to the goods undergoing the process of felting or fulling.

H is the bed of the stocks, which, with the bosom I, is arranged within a hot-water box, J, supplied in any suitable manner, and heated by steam or otherwise, the same materially assisting and improving the fulling of the goods.

To further improve, however, the cleaning and fulling or felting of the work, I make the bosom I of a perforated or open-work character, to allow of the circulation of hot water from the box J among the goods, and which perforated or other open-work construction of the bosom is, or may be, preferably given it by forming said bosom of a series of rollers, *s*, that not only allow of the passage of water in between or through them, but enable the goods, in being beaten by the hammers, to turn more freely, and so render more uniform and thorough the fulling of a number of goods worked in a mass, besides rendering a more rapid action of the beaters feasible.

Fulling-stocks thus constructed may be so fitted as to be both portable and durable, and will accomplish more work in a given time than the ordinary stocks.

Having thus fully described my invention, what I claim as new, and desire to secure by Letters Patent, is—

1. In a fulling-stock, the swing-beaters pivoted at one end, in combination with a suitable frame and lifting mechanism, substantially as described, or its equivalent, whereby the beaters are raised by friction-pressure, for the purpose set forth.

2. The combination, with the hammers or beaters B, of the cam or friction blocks C, operating to effect the lift of the former, and to suddenly release them when raised, substantially as specified.

3. The combination, with the hammers of the mill, of an adjustable spring-tension device arranged to control their fall, essentially as herein set forth.

4. The combination of the toes G, made of india-rubber or other analogous soft material, with the hammers B, substantially as specified.

In testimony that I claim the foregoing I have hereunto set my hand this 6th day of November, 1876.

WM. B. LODGE.

Witnesses:

DANL. H. BAILY,
JOSHUA DRAPER.